(12) United States Patent
Xu et al.

(10) Patent No.: US 7,403,344 B2
(45) Date of Patent: Jul. 22, 2008

(54) LENS ASSEMBLY

(75) Inventors: Jing Xu, Irvine, CA (US); Roman C. Gutierrez, La Crescenta, CA (US)

(73) Assignee: Siimpel Corporation, Arcadia, CA (US)

( * ) Notice: Subject to any disclaimer, the term of this patent is extended or adjusted under 35 U.S.C. 154(b) by 0 days.

(21) Appl. No.: 11/263,153

(22) Filed: Oct. 31, 2005

(65) Prior Publication Data

US 2006/0193063 A1  Aug. 31, 2006

Related U.S. Application Data

(60) Provisional application No. 60/657,261, filed on Feb. 28, 2005.

(51) Int. Cl.
*G02B 9/34* (2006.01)

(52) U.S. Cl. .................... 359/779; 359/778; 359/686; 359/687

(58) Field of Classification Search .................. 359/724, 359/779, 778, 771, 686, 687, 714, 715, 769
See application file for complete search history.

(56) References Cited

U.S. PATENT DOCUMENTS

| | | | |
|---|---|---|---|
| 5,142,318 A * | 8/1992 | Taniguchi et al. | 396/91 |
| 6,259,508 B1 * | 7/2001 | Shigematsu | 355/53 |
| 7,110,188 B2 * | 9/2006 | Matsui et al. | 359/714 |
| 7,283,315 B2 * | 10/2007 | Noguchi | 359/819 |
| 2002/0036832 A1 * | 3/2002 | Schultz et al. | 359/649 |
| 2003/0161054 A1 * | 8/2003 | Sato | 359/793 |
| 2004/0228009 A1 * | 11/2004 | Kamo et al. | 359/774 |
| 2005/0280904 A1 * | 12/2005 | Wang et al. | 359/717 |

* cited by examiner

*Primary Examiner*—Timothy J Thompson
(74) *Attorney, Agent, or Firm*—Macpherson Kwok Chen & Heid LLP; Mark A. Pellegrini (57) ABSTRACT

A lens assembly suitable for use in miniature cameras is disclosed. The lens assembly can have a plurality of glass lenses having spherical surfaces and a single plastic lens having aspheric surfaces, for example. Optionally, all of the lenses can be disposed within a common lens barrel. A pupil plane can be located just in front of the first lens to provide a small chief ray angle. Both the cost of the lens assembly and alignment sensitivity are advantageously mitigated.

13 Claims, 8 Drawing Sheets

| Surface No. | Type | Comment | Curvature of Radius (mm) | Thickness (mm) | N | v | Diameter (mm) |
|---|---|---|---|---|---|---|---|
| 1 | STANDARD | Aperture | Inf | 0.000 | | | 1.500 |
| 2 | STANDARD | | 2.893 | 1.060 | 1.755 | 52.3228 | 3.200 |
| 3 | STANDARD | | -14.177 | 0.333 | | | 3.200 |
| 4 | STANDARD | | -3.139 | 0.310 | 1.69895 | 30.0505 | 3.200 |
| 5 | STANDARD | | 3.343 | 0.145 | | | 3.200 |
| 6 | STANDARD | | 7.808 | 1.102 | 1.755 | 52.3228 | 3.200 |
| 7 | STANDARD | | -2.879 | 0.892 | | | 3.200 |
| 8 | EVENASPH | | 5.231 | 0.984 | 1.525279 | 55.95076 | 4.000 |
| 9 | EVENASPH | | 3.268 | D9 | | | 4.800 |
| 10 | STANDARD | | Inf | 0.300 | 1.517 | 64.1873 | 5.147 |
| 11 | STANDARD | | Inf | 0.300 | | | 5.239 |
| 12 | STANDARD | Imager | Inf | 0.000 | | | 4.942 |

FIG. 3

| Surface 8 | Nominal Value |
|---|---|
| r (mm) | 5.231 |
| k | 0 |
| A4 | -2.55060000E-02 |
| A6 | -8.95378400E-03 |
| A8 | -3.81167000E-03 |
| A10 | 5.81934100E-03 |
| A12 | -2.07117200E-03 |
| A14 | 2.38844100E-04 |
| Surface 9 | |
| r (mm) | 3.268 |
| k | 0 |
| A4 | -1.62620000E-02 |
| A6 | -1.67720000E-02 |
| A8 | 4.89286200E-03 |
| A10 | -3.55636600E-04 |
| A12 | -7.28139700E-05 |
| A14 | 9.76389400E-06 |

LENS ASSEMBLY

PRIORITY CLAIM

This patent application claims the benefit of the priority date of U.S. provisional patent application Ser. No. 60/657,261, filed on Feb. 28, 2005 and entitled AUTOFOCUS CAMERA pursuant to 35 USC 119. The entire contents of this provisional patent application are hereby expressly incorporated by reference.

TECHNICAL FIELD

The present invention relates generally to optics. The present invention relates more particularly to a lens assembly suitable for use in miniature autofocus cameras.

BACKGROUND

Miniature cameras are well known. Miniature cameras are widely used in contemporary cellular telephones. They are also used in other devices, such as laptop computers and personal digital assistants (PDAs). Miniature cameras can even be used as stand alone devices for such applications as security and surveillance.

Contemporary miniature cameras, such as those used in cellular telephones, are fixed focus cameras. That is, the focus of the cameras is preset. The camera has a small enough aperture so as to provide sufficient depth of field such that focus is generally acceptable over a wide range of distances. However, such stopping down of the camera lens severely limits the camera's use in low light conditions.

Variable focus cameras can use larger apertures, since the greater depth of field required for fixed focus cameras is not needed. The use of larger apertures substantially enhances the camera's performance in low light conditions. However, the use of larger apertures necessitates the use of higher quality lenses because more of the lens surface is used. Higher quality lenses are typically made of glass, have aspheric surfaces, and often include a plurality of elements so as to mitigate the effects of undesirable aberrations that tend to degrade an image.

However, higher quality lenses cost more than lower quality lenses. Aspheric surfaces are inherently more costly to fabricate. Further, higher quality lenses tend to be more sensitive to centering errors, because aspheric surfaces must be more precisely aligned.

In view of the foregoing, it is desirable to provide a lens assembly having sufficient performance characteristics so as to facilitate the use of the larger apertures that are needed in a variable focus camera, while at the same time minimizing the cost of manufacturing the lens assembly.

BRIEF SUMMARY

Systems and methods are disclosed herein to provide a lens assembly for a camera, such as a miniature camera that is suitable for use in cellular telephones and the like. According to one aspect of the present invention, the lens assembly can comprise a plurality of lenses that are configured so as to define a pupil plane that is located just in front of a first lens thereof such that a small chief ray angle results. According to another aspect of the present invention, the lens assembly can comprise a plurality of glass lenses and a single plastic lens. According to another aspect of the present invention, the lens assembly can comprise a plurality of lenses having lower cost spherical surfaces and a single lens having higher cost aspheric surfaces.

More particularly, the lens assembly can comprise a first lens having positive power and formed of glass with spherical surfaces; a second lens having negative power and formed of glass with spherical surfaces; a third lens having positive power and formed of glass with spherical surfaces; and a fourth lens having low power (which can be positive and/or negative) and formed of plastic with aspheric surfaces, for example.

The plurality of lenses can be configured to move in unison so as to effect focusing. For example, the plurality of lenses can be disposed within a common lens barrel, housing, or the like. The common lens barrel can be moved to effect focusing. That is, the plurality of lenses can share a common mounting system that does not readily facilitate relative movement of the lenses during normal operation, i.e., focusing. The common mounting system can optionally facilitate relative movement of some or all of the lenses during a setup or calibration process, such as to provide resolution adjustment.

The lens assembly can be configured for use in a personal electronic device, such as a cellular telephone or the like. According to one or more aspects of the present invention, the chief ray angle tends to be minimized and the sensitivity of alignment of at least some of the lens is mitigated, while at the same time costs are reduced. Moreover, the present invention provides a lens assembly having sufficient performance so as to facilitate the use of larger apertures in a variable focus camera, while at the same time minimizing the cost of providing the lens assembly.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

A method and system for focusing light upon an imaging sensor are disclosed. A plurality of glass lenses having spherical surfaces and a single plastic lens having aspheric surfaces can provide high quality while substantially reducing the cost of the lens assembly. Spherical aberrations introduced by the plurality of glass lenses are mitigated via the single plastic lens. The glass lenses can be configured to correct for chromatic aberration. The use of spherical surfaces on the glass lenses reduces costs. Thus, the present invention provides a desirable balance between quality and cost.

Figure 1:
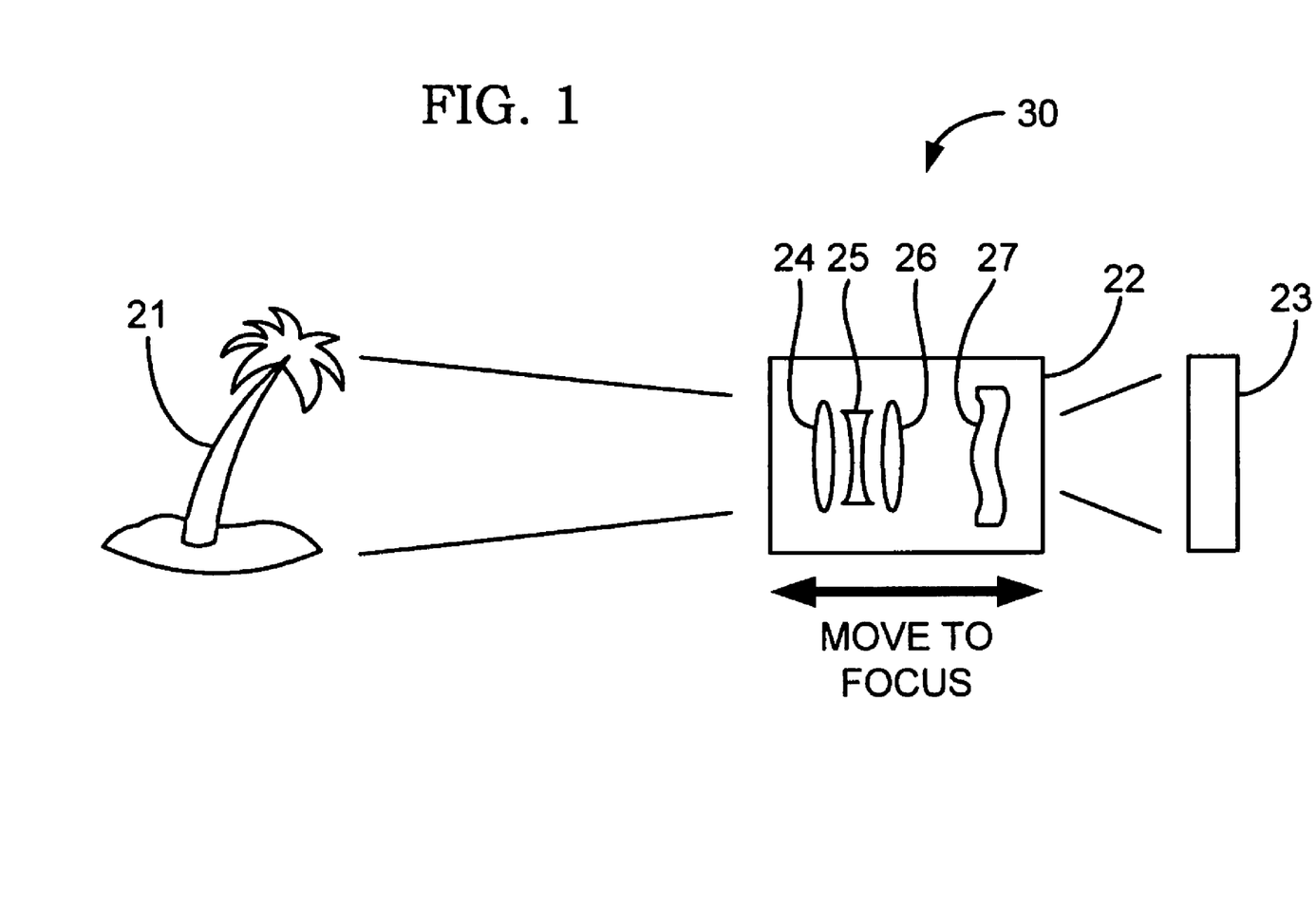
FIG. 1 is a semi-schematic illustration of an exemplary digital camera comprising a lens assembly having three spherical glass lenses (two of which have positive power and one of which has negative power) and one aspheric plastic lens, according to an embodiment of the present invention.
Figure 2:
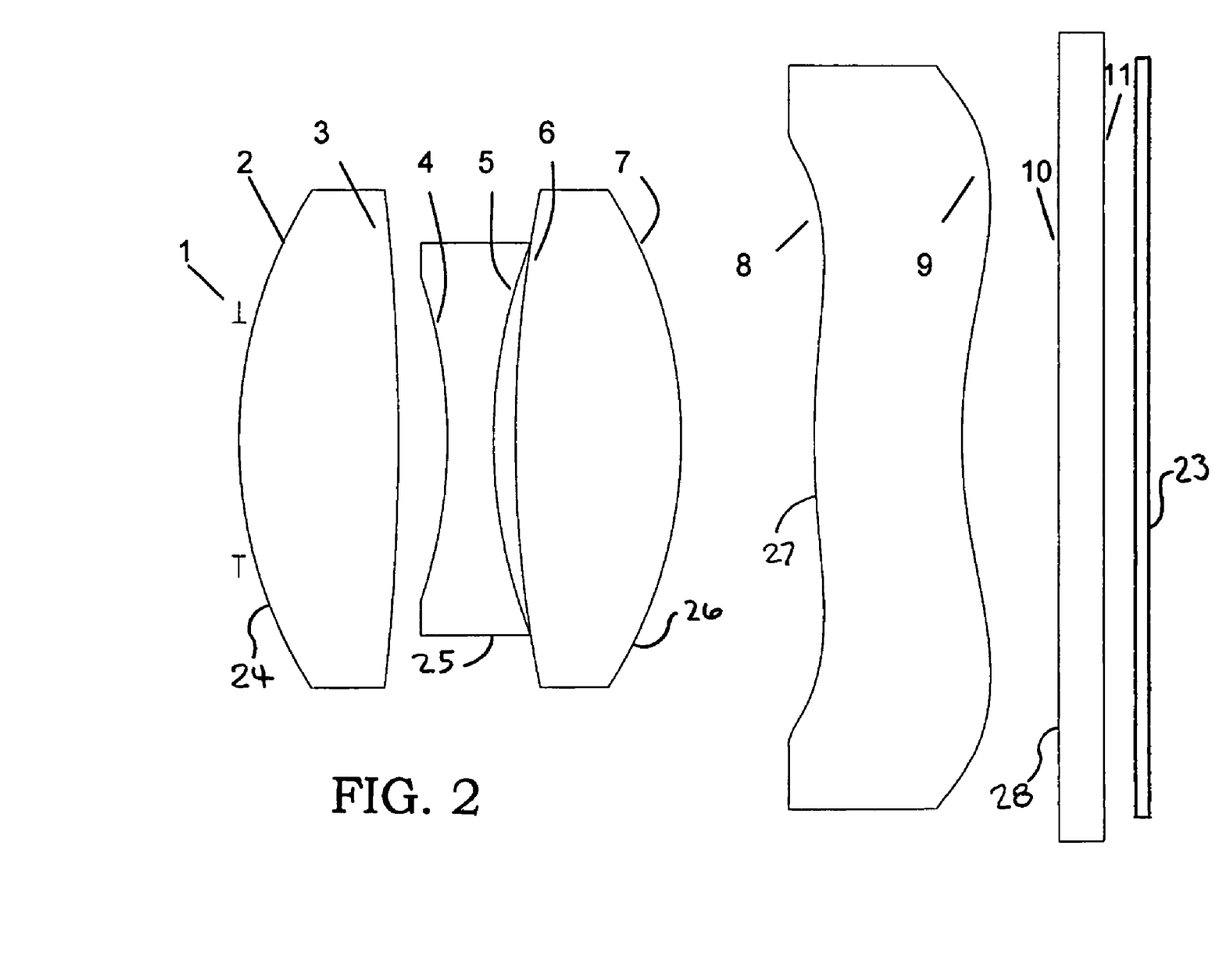
FIG. 2 is a semi-schematic side view showing the layout of the lens assembly of FIG. 1 in further detail.

Referring now to FIGS. 1 and 2, an object 21 is focused by a lens assembly 30 upon an imaging sensor 23. Thus, a camera is defined by the combination of lens assembly 30 and imaging sensor 23. Lens assembly 30 can be moved along the optical axis thereof, so as to effect variable focus.

Indeed, lens assembly 30 of the present invention can focus from 10 cm to infinity with less than 200 microns of travel. One embodiment of the present invention can focus light from 10 cm to infinity with only approximately 180 microns of travel. Contemporary lens assemblies for miniature cameras typically require approximately 300 microns of travel in order to provide focusing from 10 cm to infinity. Thus, lens assembly 30 has comparatively short travel.

Such short travel of lens assembly 30 provides several substantial advantages. The power required to move lens assembly 30 from one end of its travel to the other end thereof is substantially reduced by such reduction in the travel. Simply put, the lens does not have to travel as far to focus on average and power consumption is thus reduced. Such reduction in power consumption results in a corresponding increase in battery life, which can be important for portable electronic devices such as cellular telephones.

Further, since lens assembly 30 does not have to travel as far, on average, in order to provide desired focusing, then the time required to focus the camera, on average, is likewise reduced. Thus, the average response time of a camera using a lens assembly of the present invention is substantially reduced. Consequently, more frames per second can be imaged in some situations (those situations requiring refocusing between frames), if desired.

Of course, the reduced travel of lens assembly 30 results in a corresponding reduction in the overall length of the camera. Thus, miniature cameras that are better suited for use in cellular telephones and other small electronic devices can be provided.

The reduction in the travel of lens assembly 30 results in enhanced shock resistance. Since the travel is reduced, the maximum distance that lens assembly 30 can move when exposed to a shock is also reduced. Limiting the distance that lens assembly 30 can travel when exposed to a shock limits the lens assemblies' likelihood of gaining sufficient velocity during such an event so as to result in damage to the camera.

As discussed above, variable focus facilitates the use of the larger apertures, but also requires the use of better quality lenses. A configuration of lenses having suitable quality for use in a variable focus camera is discussed in detail below.

With particular reference to FIG. 2, lens assembly 30 can comprise a first lens 24 that has positive power, spherical surfaces, and is comprised of glass; a second lens 25 that has negative power, spherical surfaces, and is comprised of glass; a third lens 26 that has positive power, spherical surfaces, and is comprised of glass; and a forth lens 27 that has very little power (lens 27 can have positive power, negative power, or any combination of positive and negative power), aspheric surfaces, and is comprised of plastic. Optionally, a window 28 having no power, plano surfaces, and comprised of glass (or alternatively plastic), can be used, such as to seal the proximal end of lens assembly 30.

The lenses 24-27 of lens assembly 30 can be disposed within a common lens barrel 22 such that all of the lenses 24-27 move in unison during the focusing process. Optionally, one or more of lenses 24-27 can be movable with respect to others of lenses 24-27 during a setup or calibration process, so as to facilitate resolution adjustment.

During such resolution adjustment, lens assembly 30 can be positioned at infinity focus, for example. Then, any movable lens 24-27 can be moved with respect to other lenses 24-27 so as to provide enhanced resolution as measured by a modulation transfer function (MTF).

Figure 3:
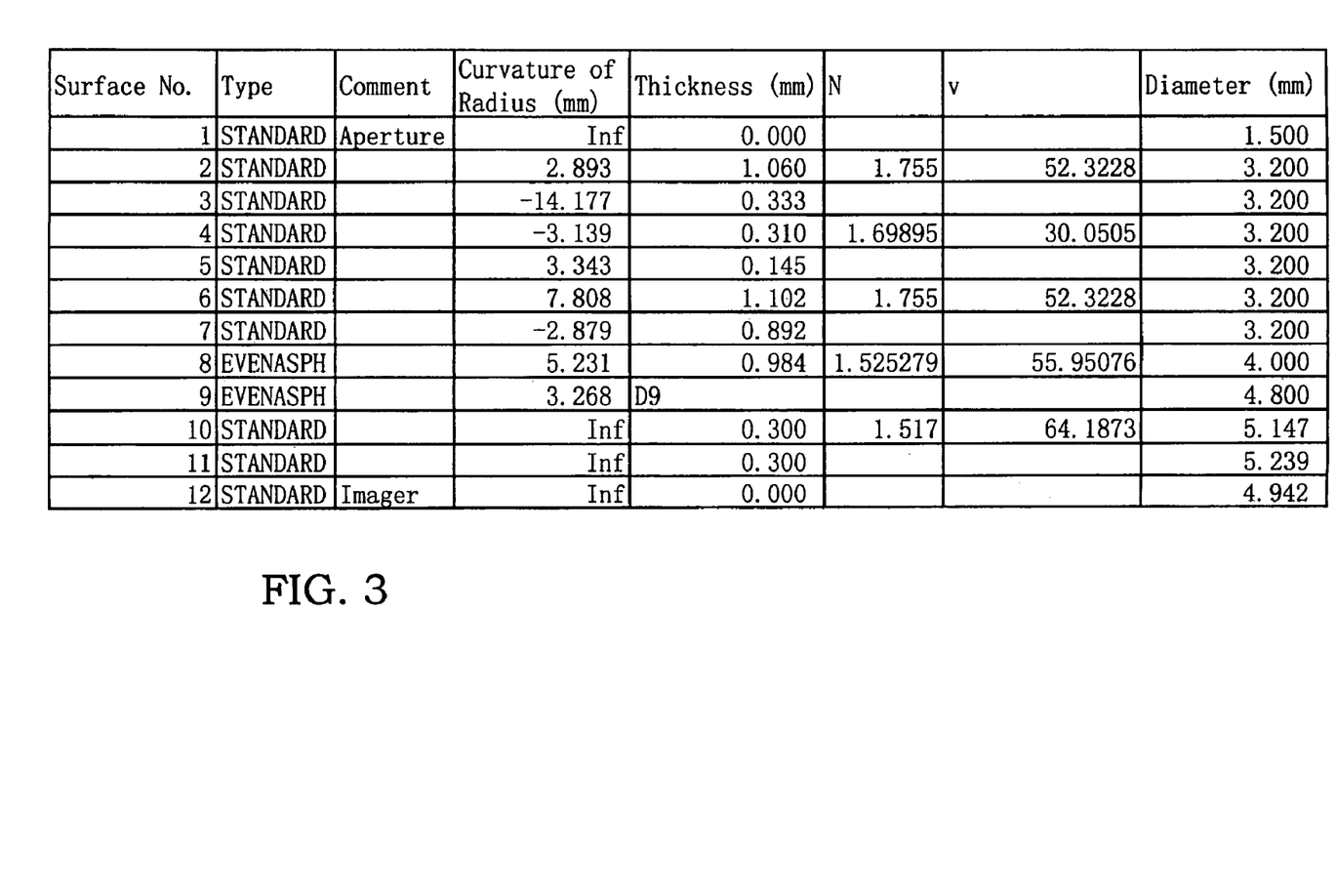
FIG. 3 is a table of exemplary lens parameters associated with the lenses of FIG. 2, according to an embodiment of the present invention.
Figure 4:
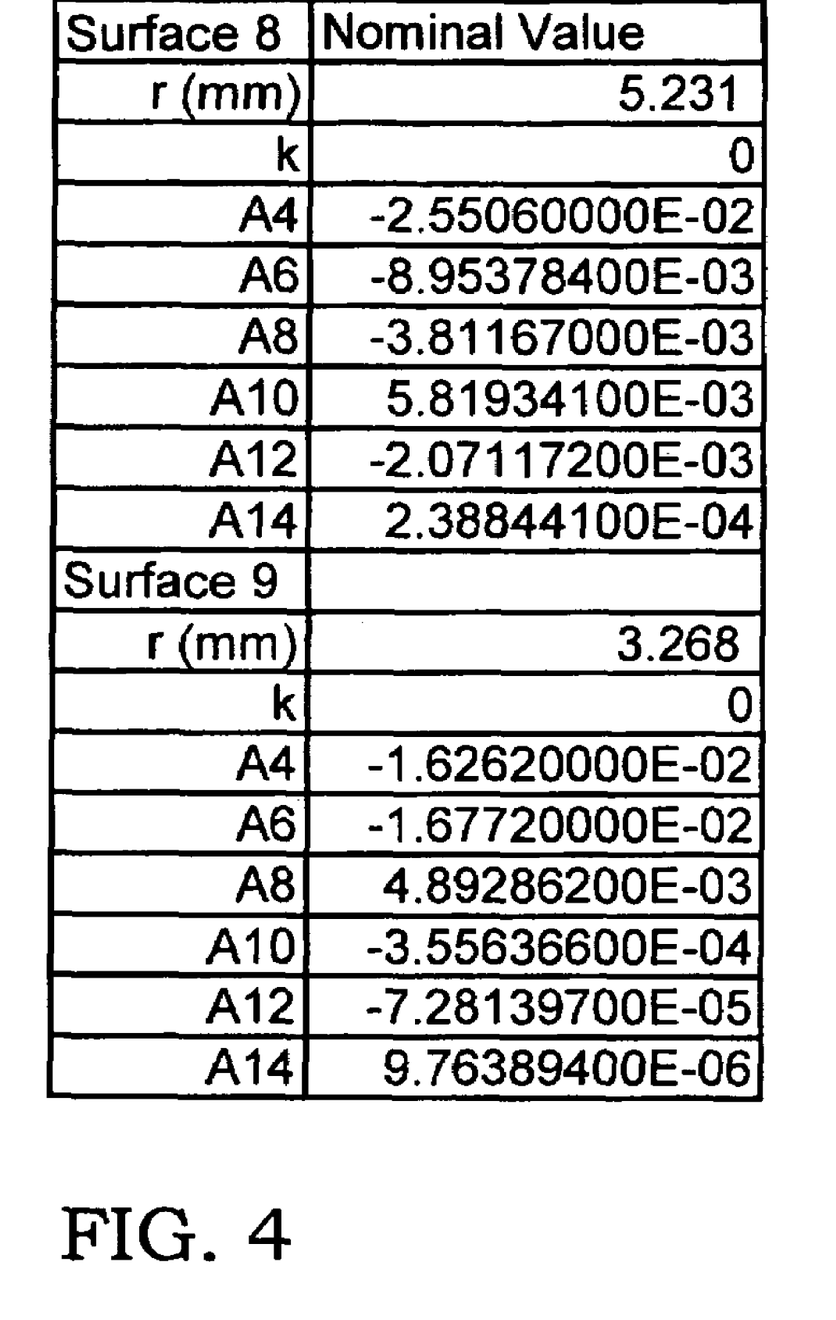
FIG. 4 is a table of exemplary nominal values for parameters associated with the aspheric lens of FIG. 2, according to an embodiment of the present invention.

The configuration shown in FIGS. 1 and 2, as well as the parameters listed in the tables of FIGS. 3 and 4, are exemplary only. Those skilled in the art will appreciate that various other configurations and/or parameters are likewise suitable. For example, more or less than three glass lenses can be used. Further, more than one plastic lens can be used or the plastic lens can comprise multiple optical elements (and thus be a duplet, triplet, etc.). Thus, the configuration shown in FIGS. 1 and 2, as well as the parameters listed in the tables of FIGS. 3 and 4, are by way of example only, and not by way of limitation.

An aperture stop 1 admits light to lenses 24-27. Aperture stop 1 is in front of first lens 24 and substantially overlaps (is generally co-planar with) the entrance pupil plane of lens assembly 30. Aperture stop 1 can be inside of lens barrel 22. Thus, the pupil plane can be inside of the lens barrel 22. This overlapping of the entrance pupil plane with aperture stop 1 advantageously provides a smaller chief ray angle at full image field, as well as a smaller size of the total camera system, as compared to contemporary camera systems. For example, the chief ray angle can be less than 20 degrees.

FIG. 3 is a table of exemplary lens parameters associated with the lenses of FIG. 2, according to an exemplary embodiment of the present invention. The surface numbers of this table correspond to the surfaces labeled in FIG. 2.

The thickness of lens 27 (listed as D9 in the table of FIG. 3) can be from approximately 0.648 mm to approximately 0.826 mm for use with objects from infinity to approximately 10 cm for the first surface. The image diameter is approximately 4.9 mm. The field of view is approximately 61.6 degrees. The focus length is approximately F=4.17. The F number is approximately 2.78.

FIG. 4 is a table of exemplary nominal values for parameters associated with the aspheric lens of FIG. 2, according to the exemplary embodiment of the present invention. As those skilled in the art will appreciate, an even aspheric surface is defined as:

$$Z=(y^2/r)/[1+\{1-(K+1)(y/r)^2\}^{1/2}]+A_4y^4+A_6y^6+A_8y^8+A_{10}y^{10}+A_{12}y^{12}+A_{14}y^{14}$$

where z represents the coordinate in the direction of the optical axis, r is the curvature radius of the surface, y represents the radial distance from the optical axis, K represents a conic coefficient, and A4, A6, A8, A10, A12, and A14 represent spheric coefficients. The two even aspheric surfaces of the plastic lens are defined in the table of FIG. 4.

Figure 5:
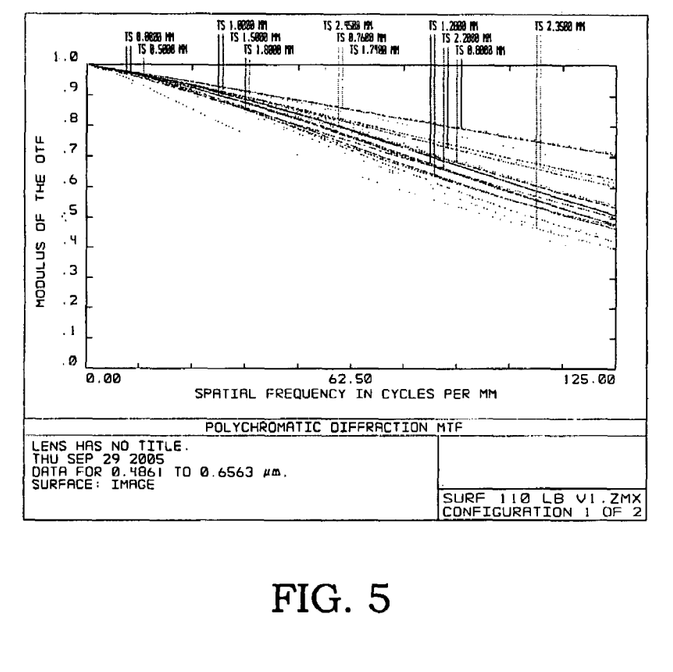
FIG. 5 is a chart showing the polychromatic diffraction modulation transfer function (MTF) of the embodiment of the present invention shown in FIGS. 1-4, for an object at infinity.

FIG. 5 is a chart showing the polychromatic diffraction modulation transfer function (MTF) of the first embodiment of the present invention, for an object at infinity. The MTF at spatial frequency of 125 cycles per millimeter is from approximately 0.36 to approximately 0.7.

Figure 6:
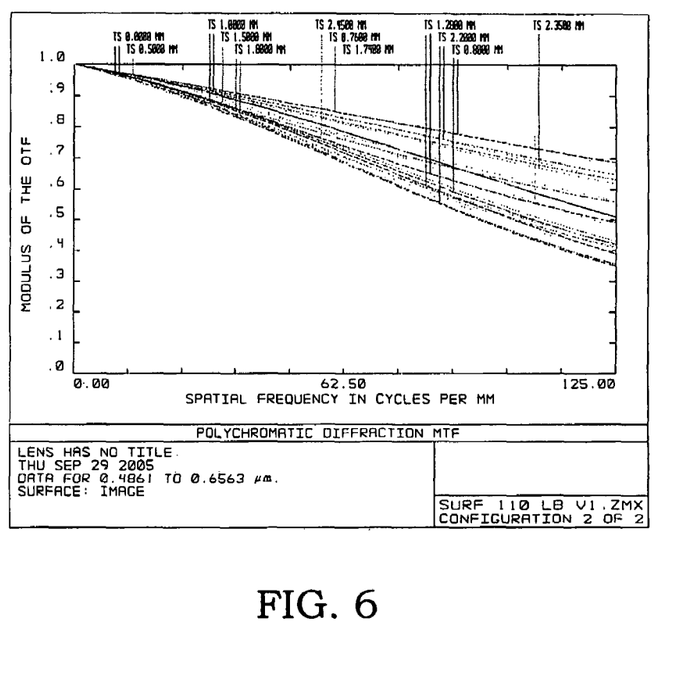
FIG. 6 is a chart showing the polychromatic diffraction modulation transfer function (MTF) of the embodiment of the present invention shown in FIGS. 1-4, for an object at 10 centimeters.

FIG. 6 is a chart showing the polychromatic diffraction modulation transfer function (MTF) of the first embodiment of the present invention, for an object at 10 centimeters. The MTF at spatial frequency of 125 cycles per millimeter is from approximately 0.3 to approximately 0.7.

Figure 7:
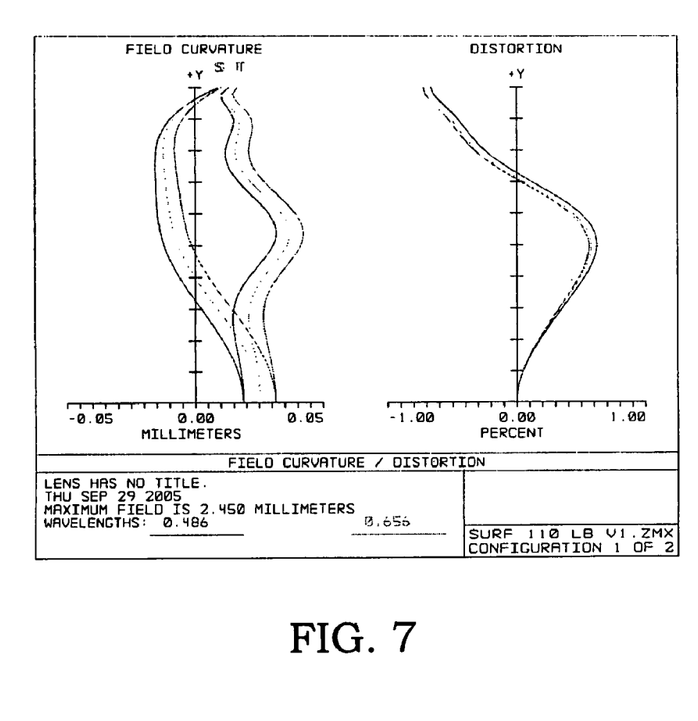
FIG. 7 is a chart showing the field curvature/distortion of the embodiment of the present invention shown in FIGS. 1-4, for an object at infinity.

FIG. 7 is a chart showing the field curvature/distortion of the first embodiment of the present invention, for an object at infinity. The maximum distortion is within +/−1%.

Figure 8:
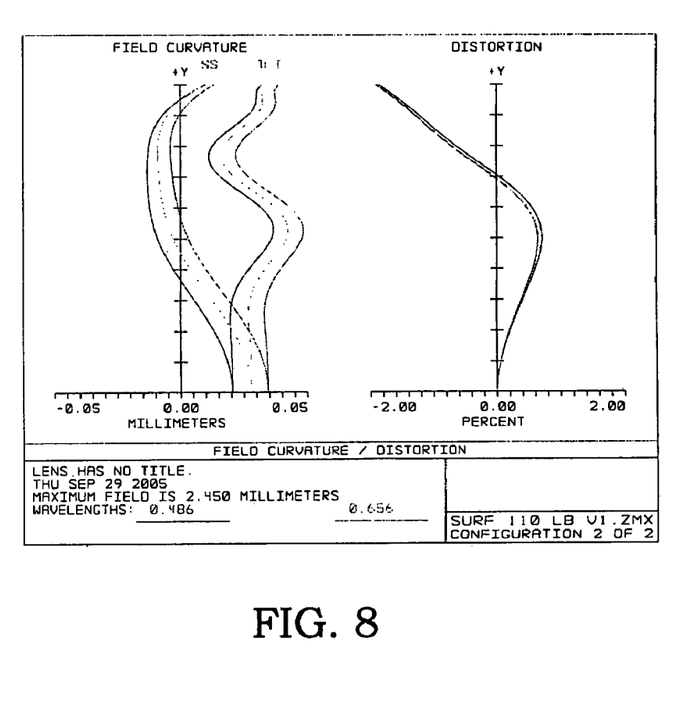
FIG. 8 is a chart showing the field curvature/distortion of the embodiment of the present invention shown in FIGS. 1-4, for an object at 10 centimeters.

FIG. 8 is a chart showing the field curvature/distortion of the first embodiment of the present invention, for an object at 10 centimeters. The maximum distortion is within +/−2%.

Figure 9:
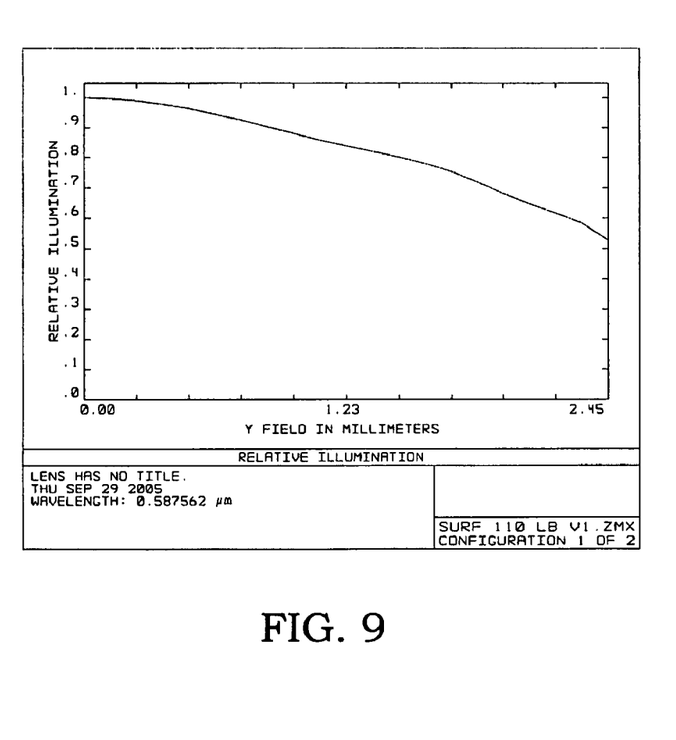
FIG. 9 is a chart showing the relative illumination of the embodiment of the present invention shown in FIGS. 1-4, for an object at infinity.

FIG. 9 is a chart showing the relative illumination of the first embodiment of the present invention, for an object at infinity. The minimum relative illumination is above 50%.

Figure 10:
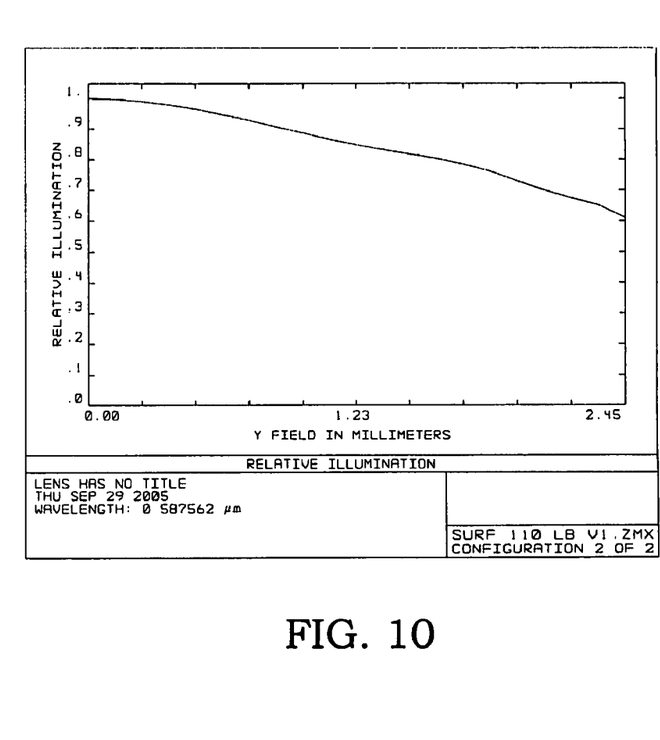
FIG. 10 is a chart showing the relative illumination of the embodiment of the present invention shown in FIGS. 1-4, for an object at 10 centimeters.

FIG. 10 is a chart showing the relative illumination of the first embodiment of the present invention, for an object at 10 centimeters. The minimum relative illumination is above 60%.

Figure 11:
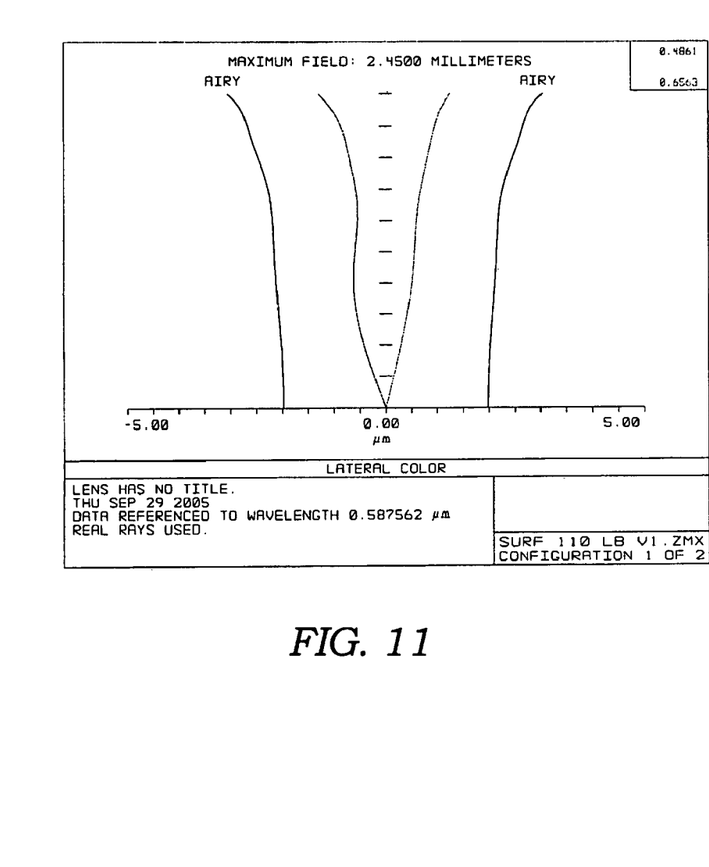
FIG. 11 is a chart showing lateral color shift of the embodiment of the present invention shown in FIGS. 1-4, for an object at infinity.

FIG. 11 is a chart showing lateral color shift for the first embodiment of the present invention, for an object at infinity. The lateral color shift with visible light is less than the Airy diffraction limit.

Figure 12:
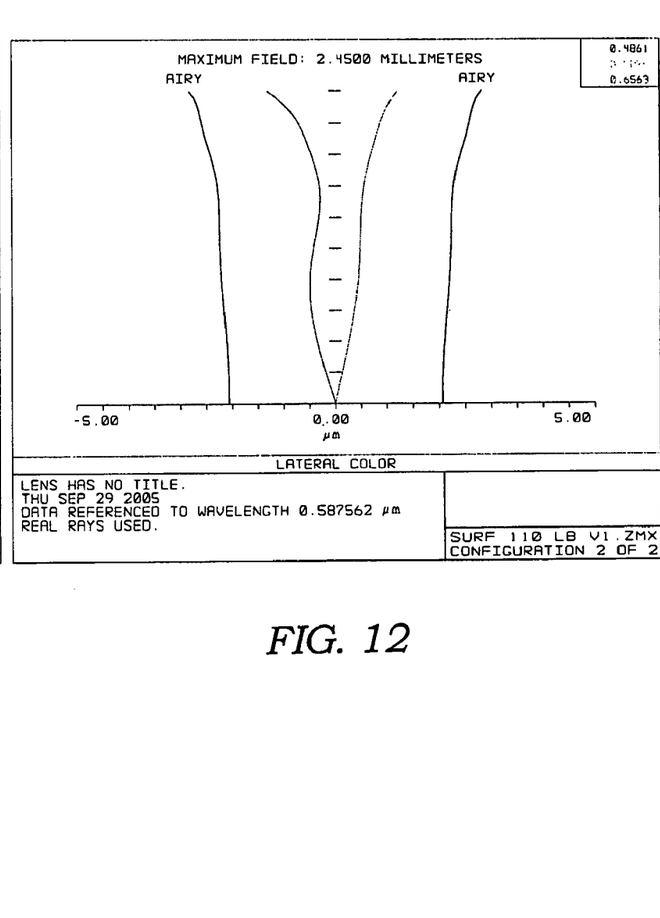
FIG. 12 is a chart showing lateral color shift of the embodiment of the present invention shown in FIGS. 1-4, for an object at 10 centimeters.

FIG. 12 is a chart showing lateral color shift for the first embodiment of the present invention, for an object at 10 centimeters. The lateral color shift with visible light is less than the Airy diffraction limit.

Locating the pupil plane in front of first lens 24 (and generally coincident with aperture stop 1) provides a reduced chief ray angle. The use of three glass lenses having spherical surfaces (which are less costly to fabricte than aspheric surfaces) in combination with a single plastic lens having aspheric surfaces substantially reduces costs.

In view of the foregoing, the present invention provides a lens assembly having sufficient performance to facilitate the use of use of larger apertures in a variable focus camera, while at the same time minimizing the cost of providing the lens assembly. Cost reduction results from the use of spherical surfaces on the glass lenses and the use of a plastic aspheric lens. Further cost reduction results from a simplified alignment process for the lenses with spherical surfaces, since they are less sensitive to alignment errors.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A lens assembly for a miniature camera, the lens assembly comprising:
   a plurality of lenses configured for use in an autofocus camera; wherein
   the lenses are configured so as to define a pupil plane in front of a first lens thereof; and
   the plurality of lenses are configured to move in unison.

2. The lens assembly as recited in claim 1, wherein the pupil plane is disposed proximate a front of a first lens.

3. The lens assembly as recited in claim 1, wherein the pupil plane defines a chief ray angle of less than 20 degrees.

4. The lens assembly as recited in claim 1, wherein the plurality of lenses comprises four lenses.

5. The lens assembly as recited in claim 1, wherein the plurality of lenses comprise a positive power first lens, a negative power second lens, a positive power third lens, and a fourth lens.

6. The lens assembly as recited in claim 1, wherein the plurality of lenses comprise four lenses having lens parameters respectively corresponding to those listed in the tables of FIGS. 3 and 4.

7. The lens assembly as recited in claim 1, wherein the plurality of lenses are disposed within a common lens barrel.

8. The lens assembly as recited in claim 1, wherein the plurality of lenses comprise three glass lenses and one plastic lens.

9. The lens assembly as recited in claim 1, wherein the plurality of lenses comprise three spherical lenses and one aspheric lens.

10. The lens assembly as recited in claim 1, wherein the last lens is an aspheric lens.

11. The lens assembly as recited in claim 1, wherein the first three lenses are plastic lenses with spherical surfaces and the last lens is a glass lens with aspheric surfaces.

12. The lens assembly as recited in claim 1, wherein the plurality of lenses are configured so as to focus light from 10 cm to infinity with a travel of less than 200 microns.

13. The lens assembly as recited in claim 1, wherein the plurality of lenses are configured so as to focus light from 10 cm to infinity with a travel of approximately 180 microns.

* * * * *